United States Patent [19]

Fujimura et al.

[11] Patent Number: 5,714,531
[45] Date of Patent: Feb. 3, 1998

[54] PROPYLENE RESIN EXTRUDED ARTICLES

[75] Inventors: Kazumasa Fujimura; Hitoshi Inagaki, both of Mie, Japan

[73] Assignee: Japan Polychem Corporation, Tokyo, Japan

[21] Appl. No.: 784,547

[22] Filed: Jan. 21, 1997

[30] Foreign Application Priority Data

| Jan. 22, 1996 | [JP] | Japan | 8-008275 |
| Jan. 24, 1996 | [JP] | Japan | 8-010058 |
| Apr. 8, 1996 | [JP] | Japan | 8-085022 |
| Apr. 9, 1996 | [JP] | Japan | 8-086440 |

[51] Int. Cl.$^6$ .......... C08K 5/5393; C08K 5/527; C08K 5/526

[52] U.S. Cl. .......... 524/99; 524/100; 524/102; 524/103; 524/104; 524/117; 524/126; 524/151; 524/153; 524/913

[58] Field of Search .......... 524/99, 100, 102, 524/103, 104, 270, 274, 151, 153, 117, 126, 913; 530/212, 213, 221

[56] References Cited

U.S. PATENT DOCUMENTS 3,365,437  1/1968  Marra et al. .......... 524/913
3,929,703  12/1975  Weymann et al. .......... 524/274
4,764,428  8/1988  Gloyer .......... 524/913
4,882,227  11/1989  Iwase et al. .......... 524/770
5,158,992  10/1992  Caselli et al. .......... 524/102
5,219,600  6/1993  Kosegaki et al. .

FOREIGN PATENT DOCUMENTS 2 278 362 A  11/1994  United Kingdom .

*Primary Examiner*—Veronica P. Hoke
*Attorney, Agent, or Firm*—Oblon, Spivak, McClelland, Maier & Neustadt, P.C.

[57] ABSTRACT

A propylene resin extruded article comprising 100 parts by weight of a propylene resin, 0.03 to 2 parts by weight of a metal salt of a rosin compound, 0.01 to 1 part by weight of a tertiary amine light stabilizer, and 0.01 to 0.5 part by weight of an aromatic phosphite and/or phosphonite antioxidant, and a propylene resin extruded article further comprising 0.01 to 0.5 part by weight of an antistatic agent in addition to the above components. The resin compound comprising the above components does not contaminate extrusion equipment, and the extruded articles are excellent in transparency, hue, thermal aging resistance and, when the antistatic agent is used, are excellent in antistatic property.

8 Claims, No Drawings

PROPYLENE RESIN EXTRUDED ARTICLES

FIELD OF THE INVENTION

This invention relates to a propylene resin extruded article containing specific additives which composition hardly contaminates extrusion equipment and is excellent in transparency, hue, and thermal aging resistance. This invention also relates to an antistatic agent-containing propylene resin composition which is excellent in antistatic properties as well as the above-described properties and yet free from bleeding of the antistatic agent that may cause reduction in transparency.

BACKGROUND OF THE INVENTION

Polypropylene is excellent in moldability, rigidity, gloss, hygienic qualities, heat resistance, and the like and is therefore molded by various molding techniques and widely used as industrial parts, daily necessaries, food containers, etc. similarly to other resins such as polyvinyl chloride and polystyrene. As compared with polyvinyl chloride or polystyrene, polypropylene has excellent heat resistance because of its crystalline characteristics and has been extending its applicability.

However, the very crystalline properties of polypropylene makes polypropylene molded articles less transparent than polyvinyl chloride and polystyrene products. In particular, when a molten polypropylene is extruded into sheeting, blow moldings or films, in which case the extruded molten resin is slowly cooled, the crystals grow during the slow cooling, resulting in further reduction in transparency.

Addition of various nucleating agents is one of approaches to improvement on polypropylene in transparency. Generally known nucleating agents include inorganic powders, aromatic carboxylic acid metal salts, aromatic phosphoric acid metal salts, and sorbitol derivatives.

Of these nucleating agents, sorbitol derivatives are the most effective in improving transparency. However, use of a sorbitol derivative is not preferred in extrusion because it is sublimated during extrusion, causing contamination of equipment, such as a molding machine and a cooling roll, and giving off an odor. On the other hand, inorganic powders, aromatic carboxylic acid metal salts and aromatic phosphoric acid metal salts produce insufficient effects in improving transparency.

In addition, a polypropylene compound containing a nucleating agent frequently contains an antistatic agent in order to prevent the molded articles from attracting dust or to improve slip properties of the molded articles. In this case, the antistatic agent bleeds out with time, which reduces the transparency.

SUMMARY OF THE INVENTION

An object of the present invention is to provide a propylene resin extruded article with excellent transparency obtained from a propylene resin compound which hardly contaminates extrusion equipment.

Another object of the present invention is to provide a propylene resin extruded article which has not only the above-described characteristics but excellent antistatic properties and yet undergoes little reduction in transparency due to bleeding of an antistatic agent.

As a result of extensive study, the inventors of the present invention have found that the above objects are accomplished by incorporating specific additives into a propylene resin and that the resulting extruded article exhibits excellent hue and thermal aging resistance as well as improved transparency.

The present invention provides a propylene resin extruded article comprising 100 parts by weight of a propylene resin, 0.03 to 2 parts by weight of a metal salt of a rosin compound, 0.01 to 1 part by weight of a tertiary amine light stabilizer, and 0.01 to 0.5 part by weight of an aromatic phosphorous ester antioxidant and/or an aromatic phosphonite antioxidant.

The present invention also provides a propylene resin extruded article comprising 100 parts by weight of a propylene resin, 0.03 to 2 parts by weight of a metal salt of a rosin compound, 0.01 to 1 part by weight of a tertiary amine light stabilizer, 0.01 to 0.5 part by weight of an aromatic phosphorous ester antioxidant and/or an aromatic phosphonite antioxidant, and 0.01 to 0.5 part by weight of an antistatic agent.

DETAILED DESCRIPTION OF THE INVENTION

The propylene resin which can be used in the invention includes a propylene homopolymer and a copolymer of propylene and a minor proportion of other polymerizable monomers (preferably in an amount of 0.1 to 5 parts by weight of propylene), which are prepared by a conventional process for homo- or copolymerizing propylene. The monomers which can be copolymerized with propylene include α-olefins (e.g., ethylene, butene, pentene, hexene, octene, decene, 3-methylbutene, 4-methylpentene), unsaturated carboxylic acids and derivatives thereof (e.g., acrylic acid, methyl acrylate, ethyl acrylate, maleic anhydride), vinyl esters (e.g., vinyl acetate, vinyl butyrate), and unsaturated aromatic monomers (styrene, α-methylstyrene). The copolymer is not limited in copolymerization form and includes a block copolymer, a random copolymer, a grafted copolymer, etc.

The propylene resin preferably has a melt flow rate (MFR) of 0.1 to 50 g/10 min, particularly 0.2 to 30 g/10 min, especially 0.4 to 20 g/10 min, as measured according to JIS-K6758 (230° C., 2.16 kg-load) from the viewpoint of flowability in extrusion and mechanical strength of the molded articles. The propylene resin to be used can be appropriately chosen from commercially available products in view of the above-mentioned flow characteristics.

The metal salt of the rosin compound which can be used in the invention preferably includes an alkali metal salt, an alkaline earth metal salt, an aluminum salt, and a zinc salt. The salt with lithium, potassium, sodium, calcium, magnesium, aluminum or zinc is preferred. A lithium, potassium or sodium salt is particularly preferred. The rosin compound may be any of a saturated type, an unsaturated type, a saturated/unsaturated mixed type, or a combination thereof. A mixed type is usually used.

The metal salt of the rosin compound for use in the present invention may be prepared by reacting a rosin compound with a metal compound. Examples of the rosin compounds include natural rosins (e.g., gum rosin, toll oil rosin, wood rosin); a variety of modified rosins (e.g., disproportionated rosin, hydrogenated rosin, dehydrogenated rosin, polymerization rosin, α,β-ethylenically unsaturated carboxylic acid modified rosin); and purification products of the above natural rosins and modified rosins. Here, the rosin compound comprises a plurality of resin acids selected from pymaric acid, sandarach pymalic acid, palastric acid, isopymalic acid, abietic acid, dehydroabietic acid, neoabietic acid, dihydropymalic acid, dihydroabietic acid and tetrahydroabietic acid. The metal compound for forming the metal salt by reacting with the above rosin compound has a metal element (e.g., sodium, potassium, magnesium) and examples thereof include compounds for forming salts with the above rosin compounds. Specifically, examples of the metal compounds include chlorides, nitrates, acetates, sulfates, carbonates, oxides and hydroxides. In the present invention, the metal salt of the rosin compound is preferably at least one metal salt of the rosin compound selected from the sodium salts of the above rosin compounds, the potassium salts of the above rosin compounds and the magnesium salt of the above rosin compounds. Further, the metal salt of the above rosin compound is preferably at least one metal salt of the rosin compound selected from a metal salt of hydrogenated rosin, a metal salt of disproportionated rosin and a metal salt of dehydrogenated rosin, more preferably at least one metal salt of the rosin compound selected from a dehydroabietic acid metal salt, dihydroabietic acid metal salt and dihydropymalic acid metal salt.

The tertiary amine light stabilizer for use in the invention preferably includes the following compounds (1) to (6).

(1) A polycondensate of dimethyl succinate and 1-(2-hydroxyethyl)-4-hydroxy-2,2,6,6-tetramethylpiperidine, (2) Tetrakis(1,2,2,6,6-pentamethyl-4-piperidyl) 1,2,3,4-butanetetracarboxylate, (3) Tris(1,2,2,6,6-pentamethyl-4-piperidyl)-dodecyl1,2,3,4-butanetetracarboxylate, (4) Condensate of N,N-bis(3-aminopropyl) ethylenediamine and 2,4-bis[N-butyl-N-(1,2,2,6,6-pentamethyl-4 -piperidyl)amino]-6-chloro-1,3,5-triazine, (5) Bis(1,2,2,6,6-pentamethyl-4-piperidyl) ester of 2-(3,5-di-t-butyl-4-hydroxybenzyl)-2-n-butylmalonic acid, and (6) Bis(1,2,2,6,6-pentamethyl-4-piperidyl) sebacate.

Of these tertiary amine light stabilizers, those having a molecular weight of 500 or more are preferred for their compatibility and manifestation of excellent thermal aging resistance. Compounds (1), (2), (3), and (4) are particularly preferred.

The aromatic phosphorous ester and/or phosphonite antioxidants which can be used in the invention preferably include the following compounds (7) to (18).

(7) Tris(2,4-di-t-butylphenyl) phosphite, (8) Tetrakis(2,4-di-t-butylphenyl)-4,4'-biphenylene diphosphonite, (9) Tris(mixed-, mono- or dinonylphenyl) phosphite,

(10) Methylenebis(4,6-di-t-butylphenyl)-2-ethylhexyl phosphite,

(11) Trisnonylphenyl phosphite,

(12) Tetrakis(2,4-di-t-butyl-5-methylphenyl)-4,4'-biphenylene diphosphonite,

(13) 4,4'-Butylidenebis(3-methyl-6-t-butylphenyl-di-tridecyl)phosphite,

(14) 1,1,3-Tris(2-methyl-4-di-tridecylphosphite-5-t-butylphenyl)butane,

(15) Bis(2,4-di-t-butylphenyl)pentaerythritol diphosphite,

(16) Bis(2,6-di-t-butyl-4-methylphenyl)pentaerythritol diphosphite,

(17) 2,2'-Ethylidenebis(4,6-di-t-butylphenyl) fluorophosphite, and

(18) Bis(2,4,6-tri-t-butylphenyl)pentaerythritol diphosphite.

Preferred of them are compounds (7) to (12), with compounds (7) and (8) being particularly preferred.

The antistatic agent which can be used in the invention preferably includes a fatty acid ester of a polyhydric alcohol, an ethylene oxide adduct of a higher aliphatic amine, a higher fatty acid alkanolamide, and a fatty acid ester of an alkyldiethanolamine. These antistatic agents may be used either individually or as a mixture of two or more thereof. The following compounds (19) to (23) are typical but non-limiting examples of useful antistatic agents.

(19) Glycerol monostearate,

(20) N,N-Bis(2-hydroxyethyl)stearylamine,

(21) Stearyldiethanolamide,

(22) Lauryldiethanolamide, and

(23) Stearic ester of stearyldiethanolamine.

The metal salt of the rosin compound is used in an amount of 0.03 to 2 parts by weight, preferably 0.05 to 1 part by weight, particularly preferably 0.1 to 0.6 part by weight, per 100 parts by weight of the propylene resin. If the amount is less than 0.03 part, sufficient transparency cannot be obtained. Amounts exceeding 2 parts are not only uneconomical but cause deterioration in transparency.

The tertiary amine light stabilizer is used in an amount of 0.01 to 1 part by weight, preferably 0.02 to 0.5 part by weight, particularly preferably 0.03 to 0.3 part by weight, per 100 parts by weight of the propylene resin. If the amount is less than 0.01 part, the extruded article has poor thermal aging resistance. Amounts exceeding 1 part are not only uneconomical but cause color change or bleeding.

The aromatic phosphite and/or phosphonite antioxidant is/are used in a total amount of 0.01 to 0.5 part by weight, preferably 0.03 to 0.4 part by weight, particularly preferably 0.05 to 0.3 part by weight, per 100 parts by weight of the propylene resin. If the total amount is less than 0.01 part, the resin compound has poor stability during extrusion. Amounts exceeding 0.5 part are not only uneconomical but cause color change or bleeding.

The antistatic agent is used in an amount of 0.01 to 0.5 part by weight, preferably 0.02 to 0.4 part by weight, particularly preferably 0.04 to 0.3 part by weight, per 100 parts by weight of the propylene resin. If the amount is less than 0.01 part, the antistatic properties are insufficient. If it exceeds 0.5 part, the antistatic agent tends to bleed out, which deteriorates the transparency of the extruded article.

If desired, the propylene resin compound may contain other additives in addition to the above-mentioned components within such amounts that would not seriously ruin the effects of the present invention. Various additives commonly used for polyolefins can be added, such as other antioxidants, heat stabilizers, ultraviolet absorbers, light stabilizers, nucleating agents, fillers, flame retarders, colorants, lubricants, neutralizers, metal deactivators (rust inhibitors), dispersants, fluorescent brighteners, electrically conducting agents, molecular weight regulators (such as peroxides), and resins or elastomers other than the above-specified propylene resin.

The extruded article according to the invention is obtained by compounding the aforesaid essential components and desired optional components and melt-kneading by means of an appropriate mixing machine or kneading machine into a resin compound, preferably pellets, and extruding the resulting resin compound. Suitable mixing or kneading machines include a Henschel mixer, a super mixer, a twin-cylinder mixer, a tumbling mixer, a ribbon blender, a Banbury mixer, a kneader blender, and a single-screw extruder, and a twin-screw extruder. The compound may be a masterbatch comprising the propylene resin and higher amounts of other components than intended, which can be diluted with the propylene resin on being extruded. Suitable extruders include a sheet extruder, a blow molding machine, a film extruder, a pipe extruder, etc. which are commonly employed for polyolefin extrusion. Of extruded articles, extruded sheeting is sometimes subjected to thermoforming, such as vacuum forming, pressure forming, and vacuum pressure forming.

The present invention will now be illustrated in greater detail with reference to Examples, but it should be understood that the invention is not construed as being limited thereto. Unless otherwise indicated, all the percents and parts are by weight.

EXAMPLE 1

A hundred parts of a propylene-ethylene random copolymer having an MFR of 2.5 g/10 min and an ethylene content of 3.0% was compounded with 0.1 part of calcium stearate as a neutralizer and the additives shown in Table 1 below and mixed in a super mixer for 3 minutes. The mixture was melt-kneaded in an extruder (a screw diameter: 50 mm) heated at 250° C. The resulting resin compound was melt-kneaded in an extruder (screw diameter: 35 mm) set at 230° C. and extruded from a T-die having a width of 35 cm. The extruded sheet was cooled through a pair of hard chrome-plated metallic rolls in which water at 60° C. was circulating to obtain a 0.7 mm thick sheet.

The contamination of the metallic rolls was observed with the naked eye. The resulting extruded sheet was evaluated in terms of haze in accordance with JIS-K7105 and hue (b value) with Color Machine manufactured by Nihon Denshoku K. K. Further, the sheet was put in an oven aging tester set at 120° C. to measure the aging time. The results of evaluation are shown in Table 2.

EXAMPLES 2 TO 5 AND COMPARATIVE EXAMPLES 1 TO 7

Extruded sheets were prepared in the same manner as in Example 1, except for changing the amounts and kinds of the additives as shown in Table 1. The results of evaluation made on the resulting sheets are shown in Table 2.

TABLE 1

| Example No. | Kind* and Amount of Additives (part) | | | | | | | |
|---|---|---|---|---|---|---|---|---|
| | A | B | C | D | E | F | G | H |
| 1 | 0.3 | — | — | 0.1 | — | 0.2 | — | — |
| 2 | 0.3 | — | — | 0.05 | — | 0.2 | — | — |
| 3 | 0.3 | — | — | — | — | 0.2 | 0.1 | — |
| 4 | 0.3 | — | — | 0.1 | — | 0.05 | — | — |
| 5 | 0.3 | — | — | — | 0.1 | 0.2 | — | — |
| Compara. Example No. | | | | | | | | |
| 1 | — | 0.3 | — | — | — | 0.2 | — | 0.1 |
| 2 | — | — | 0.3 | — | — | 0.2 | — | 0.1 |
| 3 | 0.3 | — | — | — | — | 0.2 | — | 0.1 |
| 4 | 0.3 | — | — | — | — | 0.2 | — | — |
| 5 | 0.3 | — | — | 0.1 | — | — | — | — |
| 6 | — | 0.3 | — | 0.1 | — | 0.2 | — | — |
| 7 | — | — | — | 0.1 | — | 0.2 | — | — |

Note:
*Additives A to C are nucleating agents; additives D and E are tertiary amine light stabilizers; F and G are phosphorus type antioxidants; and H is a phenolic antioxidant.
A: Potassium and sodium salts [Na/K = 0.85/2.2 (weight ratio)] of rosin compound composed of dehydroabietic acid and tetrahydroabietic acid [dehydro-/tetrahydro- = 0.84/0.16 (mole ratio)].

TABLE 1-continued

| Example No. | Kind* and Amount of Additives (part) | | | | | | | |
|---|---|---|---|---|---|---|---|---|
| | A | B | C | D | E | F | G | H |

B: 1,2,3,4-Di(p-methylbenzylidene)sorbitol (Gelol MD, produced by New Japan Chemical Co., Ltd.)
C: Aluminum p-t-butylbenzoate (PTBBAAL, produced by Shell Chemical)
D: Polycondensate of dimethyl succinate and 1-(2-hydroxyethyl)-4-hydroxy-2,2,6,6-tetramethylpiperidine
E: Condensate of N,N-bis(3-aminopropyl)ethylenediamine and 2,4-bis[N-butyl-N-(1,2,2,6,6-pentamethyl-4-piperidyl)amino]-6-chloro-1,3,5-triazine
F: Tris(2,4-di-t-butylphenyl) phosphite
G: Tetrakis(2,4-di-t-butylphenyl)-4,4'-biphenylene diphosphonite
H: Tetrakis[methylenebis-3-(3',5'-di-t-butyl-4'-hydroxyphenyl)propionate]methane

TABLE 2

| Example No. | Contamination on Rolls | Haze (%) | Hue (b Value) | Aging Time (120° C.) (hr) |
|---|---|---|---|---|
| 1 | not observed | 7.9 | 0.8 | >500 |
| 2 | " | 7.0 | 0.8 | >500 |
| 3 | " | 7.0 | 0.8 | >500 |
| 4 | " | 7.3 | 0.9 | >500 |
| 5 | " | 7.2 | 0.9 | >500 |
| Compara. Example No. | | | | |
| 1 | observed | 7.5 | 0.8 | >500 |
| 2 | not observed | 21.5 | 0.8 | >500 |
| 3 | " | 7.5 | 1.2 | >500 |
| 4 | " | 7.3 | 0.9 | <72 |
| 5 | observed | 8.5 | 1.2 | >500 |
| 6 | " | 7.7 | 0.9 | >500 |
| 7 | not observed | 35.0 | 0.9 | >500 |

As can be seen from Tables 1 and 2 above, where a general combination of a phosphorus type antioxidant and a phenolic antioxidant was used in combination with a nucleating agent other than a metal salt of a rosin compound (Comparative Examples 1 and 2) or a metal salt of a rosin compound (Comparative Example 3), the rolls were contaminated or the resulting extruded article had deteriorated transparency (Comparative Examples 1 and 2), or the extruded article had a deteriorated hue (Comparative Example 3). To the contrary, in Examples where a metal salt of a rosin compound, a tertiary amine light stabilizer, and a phosphorus type antioxidant were used in combination, satisfactory results were obtained in all the properties tested. In Comparative Examples 5 and 4 in which a metal salt of a rosin compound was combined with either a tertiary amine light stabilizer or a phosphorus type antioxidant, contamination of rolls occurred, or the resulting extruded article had a deteriorated hue or poor thermal aging resistance. Even when a combination of a tertiary amine light stabilizer and a phosphorus type antioxidant was used, if no nucleating agent was used (Comparative Example 7) or if a nucleating agent other than a metal salt of a rosin compound was used (Comparative Example 6), the results were unfavorable in terms of transparency or roll contamination.

EXAMPLE 6

A hundred parts of a propylene-ethylene random copolymer having an MFR of 2.5 g/10 min and an ethylene content of 3.0% was compounded with 0.1 part of calcium stearate as a neutralizer and the additives shown in Table 3 below and mixed in a super mixer for 3 minutes. The mixture was melt-kneaded in an extruder (a screw diameter: 50 mm) heated at 250° C. to prepare a resin compound. The resulting resin compound was melt-kneaded in an extruder (screw diameter: 35 mm) set at 230° C., extruded from a T-die having a width of 35 cm, cooled through a pair of hard chrome-plated metallic rolls in which water at 60° C. was circulating, and taken up while subjecting one side of the sheet to a corona discharge treatment so as to give a wet tension of 44 dyne/cm to obtain a 0.7 mm thick sheet.

The contamination of the metallic rolls was observed with the naked eye. The resulting extruded sheet was evaluated in terms of haze in accordance with JIS-K7105, hue (b value) with Color Machine manufactured by Nihon Denshoku K.K., and rate of static charge decay with Static Honestmeter manufactured by Shishido Shokai K.K. The haze of the sheet was also measured after it was put in an oven aging tester set at 70° C. for 7 days. Further, the sheet was put in a Geer oven aging tester set at 120° C., and the aging time was measured. The results of evaluation are shown in Table 4 below.

EXAMPLES 7 TO 12 AND COMPARATIVE EXAMPLES 8 TO 15

Extruded sheets were prepared in the same manner as in Example 6, except for changing the amounts and kinds of the additives as shown in Table 3. The results of evaluation made on the resulting sheets are shown in Table 4.

TABLE 3

| Example No. | Kind* and Amount of Additives (part) | | | | | | | | | | | |
|---|---|---|---|---|---|---|---|---|---|---|---|---|
| | A | B | C | D | E | F | G | I | J | K | L | H |
| 6 | 0.3 | — | — | 0.1 | — | 0.2 | — | 0.1 | — | — | — | — |
| 7 | 0.2 | — | — | 0.1 | — | 0.2 | — | — | 0.1 | — | — | — |
| 8 | 0.3 | — | — | 0.1 | — | 0.2 | — | — | — | 0.1 | — | — |
| 9 | 0.3 | — | — | 0.1 | — | 0.2 | — | — | — | — | 0.2 | — |
| 10 | 0.3 | — | — | 0.1 | — | 0.05 | — | — | — | 0.1 | — | — |
| 11 | 0.3 | — | — | 0.1 | — | — | 0.1 | — | — | 0.1 | — | — |
| 12 | 0.3 | — | — | — | 0.1 | 0.2 | — | — | — | 0.1 | — | — |
| Compara. Example No. | | | | | | | | | | | | |
| 8 | — | 0.3 | — | — | — | 0.2 | — | 0.1 | — | — | — | 0.1 |
| 9 | — | 0.3 | — | — | — | 0.2 | — | — | — | 0.1 | — | 0.1 |
| 10 | 0.3 | — | — | — | — | 0.2 | — | — | — | 0.1 | — | 0.1 |
| 11 | 0.3 | — | — | — | — | 0.2 | — | — | — | 0.1 | — | — |
| 12 | 0.3 | — | — | 0.1 | — | — | — | — | — | 0.1 | — | — |
| 13 | — | 0.3 | — | 0.1 | — | 0.2 | — | — | — | 0.1 | — | — |
| 14 | — | — | — | 0.1 | — | 0.2 | — | — | — | 0.1 | — | — |
| 15 | — | — | 0.3 | 0.1 | — | 0.2 | — | — | — | 0.1 | — | — |

Note:
*Additives A to H are the same as in the footnote of Table 1. Additives I to L are antistatic agents.
I: Glycerol monostearate
J: N,N-Bis(2-hydroxyethyl)stearylamine
K: Lauryldiethanolamide
L: Stearic ester of stearyldiethanolamine

TABLE 4

| Example No. | Roll Contamination | Haze | | Hue (b Value) | Static Decay Rate (%) | Aging Time (120° C.) (hr) |
|---|---|---|---|---|---|---|
| | | Initial (%) | 45° Cx 7 Dys (%) | | | |
| 6 | not observed | 7.9 | 8.0 | 0.8 | 95 | >500 |
| 7 | " | 7.5 | 7.6 | 0.9 | 90 | >500 |
| 8 | " | 7.0 | 7.1 | 0.9 | 90 | >500 |
| 9 | " | 7.0 | 7.4 | 0.9 | 90 | >500 |
| 10 | " | 7.1 | 7.2 | 0.9 | 90 | >500 |
| 11 | " | 7.0 | 7.2 | 0.9 | 90 | >500 |
| 12 | " | 7.2 | 7.3 | 0.9 | 90 | >500 |
| Compara. Example No. | | | | | | |
| 8 | observed | 7.5 | 13.0 | 0.8 | 95 | >500 |
| 9 | " | 7.8 | 9.5 | 1.4 | 90 | >500 |
| 10 | not observed | 7.2 | 7.4 | 1.6 | 90 | >500 |
| 11 | " | 7.3 | 7.4 | 1.2 | 90 | <72 |
| 12 | observed | 8.5 | 8.7 | 1.7 | 90 | >500 |
| 13 | " | 7.7 | 8.5 | 1.4 | 90 | >500 |
| 14 | not observed | 35.0 | 37.5 | 1.0 | 90 | >500 |
| 15 | " | 21.5 | 23.5 | 0.9 | 90 | >500 |

According to the present invention, contamination of extrusion equipment is prevented, and extruded articles excellent in transparency, hue, and thermal aging resistance can be obtained. Where an antistatic agent is used, the present invention produces, in addition to the above effects, the effect that extruded articles obtained exhibit excellent antistatic properties while being free from bleeding of the antistatic agent which would deteriorate transparency.

While the invention has been described in detail and with reference to specific examples thereof, it will be apparent to one skilled in the art that various changes and modifications can be made therein without departing from the spirit and scope thereof.

What is claimed is:

1. A propylene resin extruded article comprising 100 parts by weight of a propylene resin, 0.03 to 2 parts by weight of a metal salt of a rosin compound, 0.01 to 1 part by weight of a tertiary amine light stabilizer, and 0.01 to 0.5 part by weight of at least one of an aromatic phosphorous ester antioxidant and an aromatic phosphonite antioxidant.

2. A propylene resin extruded article comprising 100 parts by weight of a propylene resin, 0.03 to 2 parts by weight of a metal salt of a rosin compound, 0.01 to 1 part by weight of a tertiary amine light stabilizer, 0.01 to 0.5 part by weight of at least one of an aromatic phosphorous ester antioxidant and an aromatic phosphonite antioxidant, and 0.01 to 0.5 part by weight of an antistatic agent.

3. A propylene resin extruded article according to claim 2, wherein said antistatic agent is at least one compound selected from a fatty acid ester of a polyhydric alcohol, an ethylene oxide adduct of a higher aliphatic amine, a higher fatty acid alkanolamide, and a fatty acid ester of an alkyl diethanolamine.

4. A propylene resin extruded article according to claim 1, wherein said propylene resin has a melt flow rate of 0.1 to 50 g/10 min.

5. A propylene resin extruded article according to claim 1, wherein said tertiary amine light stabilizer is selected from the group consisting of a polycondensate of dimethyl succinate and 1-(2-hydroxyethyl)-4-hydroxy-2,2,6,6-tetramethylpiperidine; tetrakis(1,2,2,6,6-pentamethyl-4-piperidyl) 1,2,3,4-butanetetracarboxylate; tris(1,2,2,6,6-pentamethyl-4-piperidyl)-dodecyl 1,2,3,4-butanetetracarboxylate; and a condensate of N,N-bis(3-aminopropyl)ethylenediamine and 2,4-bis[N-butyl-N-(1,2,2,6,6-pentamethyl-4-piperidyl)amino]-6-chloro-1,3,5-triazine.

6. A propylene resin extruded article according to claim 1, wherein said at least one of an aromatic phosphorous ester antioxidant and an aromatic phosphonite antioxidant is selected from the group consisting of tris(2,4-di-t-butylphenyl)phosphite and tetrakis(2,4-di-t-butylphenyl)-4,4'-biphenylene diphosphonite.

7. A propylene resin extruded article according to claim 1, wherein said metal salt of the rosin compound is a potassium, sodium or magnesium salt of a resin acid selected from the group consisting of dehydrobietic acid, dihydroabietic acid and dihydropymalic acid.

8. A propylene resin extruded article according to claim 1, wherein said propylene resin has a melt flow rate of 0.1 to 50 g/10 min;

said tertiary amine light stabilizer is selected from the group consisting of a polycondensate of dimethyl succinate and 1-(2-hydroxyethyl)-4-hydroxy-2,2,6,6-tetramethylpiperidine; tetrakis(1,2,2,6,6-pentamethyl-4-piperidyl) 1,2,3,4-butanetetracarboxylate; tris(1,2,2,6,6-pentamethyl-4-piperidyl)-dodecyl 1,2,3,4-butanetetracarboxylate; and a condensate of N,N-bis(3-aminopropyl)ethylenediamine and 2,4-bis[N-butyl-N-(1,2,2,6,6-pentamethyl-4-piperidyl)amino]-6-chloro-1,3,5-triazine;

said at least one of an aromatic phosphorous ester antioxidant and an aromatic phosphonite antioxidant is selected from the group consisting of tris(2,4-di-t-butylphenyl) phosphite and tetrakis(2,4-di-t-butylphenyl)-4,4'-biphenylene diphosphonite; and said metal salt of the rosin compound is a potassium, sodium or magnesium salt of a resin acid selected from the group consisting of dehydroabietic acid, dihydroabietic acid and dihydropymalic acid.

* * * * *